(12) United States Patent  
Bierbaum et al.

(10) Patent No.: US 8,126,769 B1
(45) Date of Patent: *Feb. 28, 2012

(54) TRANSIT CARD STATE SEQUENCE SELF-HELP CORRECTION

(75) Inventors: Christopher J. Bierbaum, Overland Park, KS (US); Robin D. Katzer, Olathe, KS (US); Todd N. Koellner, Overland Park, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 403 days.

This patent is subject to a terminal disclaimer.

(21) Appl. No.: 12/187,953

(22) Filed: Aug. 7, 2008

(51) Int. Cl.
*G06Q 99/00* (2006.01)
(52) U.S. Cl. ............... 705/13; 235/384; 235/382
(58) Field of Classification Search .............. 705/13; 235/384, 382
See application file for complete search history.

(56) References Cited

U.S. PATENT DOCUMENTS 5,298,726 A * 3/1994 Aubrey .................. 235/384
(Continued)

FOREIGN PATENT DOCUMENTS

GB      2152720 A  *  8/1985

OTHER PUBLICATIONS

Balaban, Dan, "Japan Goes Mobile With Transit Ticketing," Card Technology, May 2006, vol. 11, Issue 5, pp. 18-20.

(Continued)

*Primary Examiner* — Akiba Robinson Boyce

(57) ABSTRACT

A method of electronic transit fare payment is provided. The method comprises receiving a transit card state correction input and storing a transit card state correction record based on receiving the transit card state correction input. The method also comprises changing the transit card state in response to receiving the transit card state correction input. The method also comprises providing transit card information including the transit card state correction record to a exit fare gate to support electronic payment with a transit card.

17 Claims, 6 Drawing Sheets

U.S. PATENT DOCUMENTS

| | | | |
|---|---|---|---|
| 5,590,038 | A | 12/1996 | Pitroda |
| 5,819,234 | A | 10/1998 | Slavin et al. |
| 5,991,749 | A | 11/1999 | Morrill, Jr. |
| 6,003,776 | A | 12/1999 | Drupsteen |
| 6,736,317 | B1 | 5/2004 | McDonald et al. |
| 7,224,291 | B2 | 5/2007 | Hassett |
| 7,356,541 | B1 | 4/2008 | Doughty |
| 7,527,208 | B2 | 5/2009 | Hammad et al. |
| 7,562,818 | B1 * | 7/2009 | Bierbaum et al. ............ 235/384 |
| 7,587,332 | B2 * | 9/2009 | Andrews et al. ................ 705/13 |
| 7,797,248 | B1 * | 9/2010 | Bierbaum et al. ............. 705/66 |
| 7,911,382 | B2 | 3/2011 | Liu et al. |
| 7,922,084 | B2 | 4/2011 | Ishibashi et al. |
| 2002/0002534 | A1 | 1/2002 | Davis et al. |
| 2002/0004762 | A1 | 1/2002 | Izumoto |
| 2002/0133409 | A1 | 9/2002 | Sawano et al. |
| 2002/0161729 | A1 | 10/2002 | Andrews |
| 2003/0019927 | A1 | 1/2003 | Lindgren et al. |
| 2004/0016801 | A1 | 1/2004 | Newsome et al. |
| 2004/0139018 | A1 | 7/2004 | Anderson et al. |
| 2005/0125317 | A1 | 6/2005 | Winkelman et al. |
| 2006/0189297 | A1 | 8/2006 | Jung |
| 2007/0034107 | A1 | 2/2007 | Barbeau et al. |
| 2007/0150949 | A1 | 6/2007 | Futamura et al. |
| 2007/0210936 | A1 | 9/2007 | Nicholson |
| 2008/0068221 | A1 | 3/2008 | Park |
| 2008/0116264 | A1 | 5/2008 | Hammad et al. |
| 2008/0156873 | A1 * | 7/2008 | Wilhelm et al. ............... 235/384 |
| 2008/0201212 | A1 | 8/2008 | Hammad et al. |
| 2008/0208681 | A1 | 8/2008 | Hammad et al. |
| 2009/0002237 | A1 | 1/2009 | Nonoyama |
| 2009/0015398 | A1 | 1/2009 | Bhogal et al. |
| 2010/0121563 | A1 | 5/2010 | Chavez et al. |
| 2010/0292921 | A1 | 11/2010 | Zachariah et al. |

OTHER PUBLICATIONS

Bierbaum, Christopher J., et al., Patent Application entitled "Single Transit Card to Multiple Rider Trip Methods and Architecture," filed Dec. 22, 2008, U.S. Appl. No. 12/342,066.

Bierbaum, Christopher J., et al., Patent Application entitled "Transit Card Credit Authorization," filed Jan. 6, 2009, U.S. Appl. No. 12/349,513.

Bierbaum, Christopher J., et al., Patent Application entitled "Transit Payment and Handset Navigation Integration," filed Jan. 6, 2009, U.S. Appl. No. 12/349,509.

Gregoire, Lisa, "Visa Removes Canada 3000 Credit Charge," Edmonton Journal, Mar. 9, 2002, p. B.7, Edmonton, Alta.

Office Action with Restriction Requirement dated Jun. 1, 2011, U.S. Appl. No. 12/342,066, filed Dec. 22, 2008.

Office Action dated Aug. 4, 2011, U.S. Appl. No. 12/342,066, filed Dec. 22, 2008.

Office Action dated Jun. 22, 2011, U.S. Appl. No. 12/349,509, filed Jan. 6, 2009.

Final Office Action dated Jan. 4, 2012, U.S. Appl. No. 12/342,066, filed on Dec. 22, 2008.

Pre-Interview Communication dated Dec. 7, 2011, U.S. Appl. No. 12/349,513 filed on Jan. 6, 2009.

Office Action—Restriction Requirement dated Dec. 20, 2011, U.S. Appl. No. 12/349,509, filed on Jan. 6, 2009.

* cited by examiner

TRANSIT CARD STATE SEQUENCE SELF-HELP CORRECTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A point-of-sale (POS) terminal may receive payment information from a contactless card. A contactless card communicates with a point-of-sale terminal or other device at least in part without physically contacting the point-of-sale terminal, for example through radio frequency communication conducted in the proximity of the point-of-sale terminal. This radio frequency communication may include near field communication (NFC) technology. Other contactless communication links may be established using optical signals and/or sonic signals. In one payment scenario, a commuter may present a transit card to pay a fare and obtain access to a transportation provider vehicle, for example a bus, a train, or a subway train. In another payment scenario, an electronic purse may be provided as an application on a portable electronic device, for example on a mobile phone, a personal digital assistant, or other device, a payment may be made from the electronic purse. In some designs, some financial information, for example fund balances, may be stored in a limited access portion of memory referred to as a secure element (SE).

SUMMARY

In an embodiment, a method of electronic transit fare payment is provided. The method comprises receiving a transit card state correction input and storing a transit card state correction record based on receiving the transit card state correction input. The method also comprises changing the transit card state in response to receiving the transit card state correction input. The method also comprises providing transit card information including the transit card state correction record to a exit fare gate to support electronic payment with a transit card.

In another embodiment, a method of charging a fare electronically is provided. The method comprises wirelessly receiving a request to correct a transit card state and wirelessly transmitting a transit card state correction in response to the request to correct the transit card state. The method also comprises storing information about the transit card state correction. The method also comprises receiving information from an exit fare gate about a transit card associated with the transit card state correction and charging a fare to the transit card based on the information received from the exit fare gate and based on the information about the transit card state correction.

In another embodiment, a mobile device is provided. The mobile device comprises a processor, a near field communication transceiver, and a transit card application. The near field communication transceiver is adapted for communicating with an entry fare gate to enter the transit system and with an exit fare gate to pay for use of the transit system. When executed by the processor, the transit card application that has a funds balance, is adapted to change an entry coded/exit coded state in response to an input received by the mobile device, to store a record of the change to the entry coded/exit coded state, and to deduct a fare from the funds balance based on communicating with the exit fare gate and on the record of the change to the entry coded/exit coded state.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
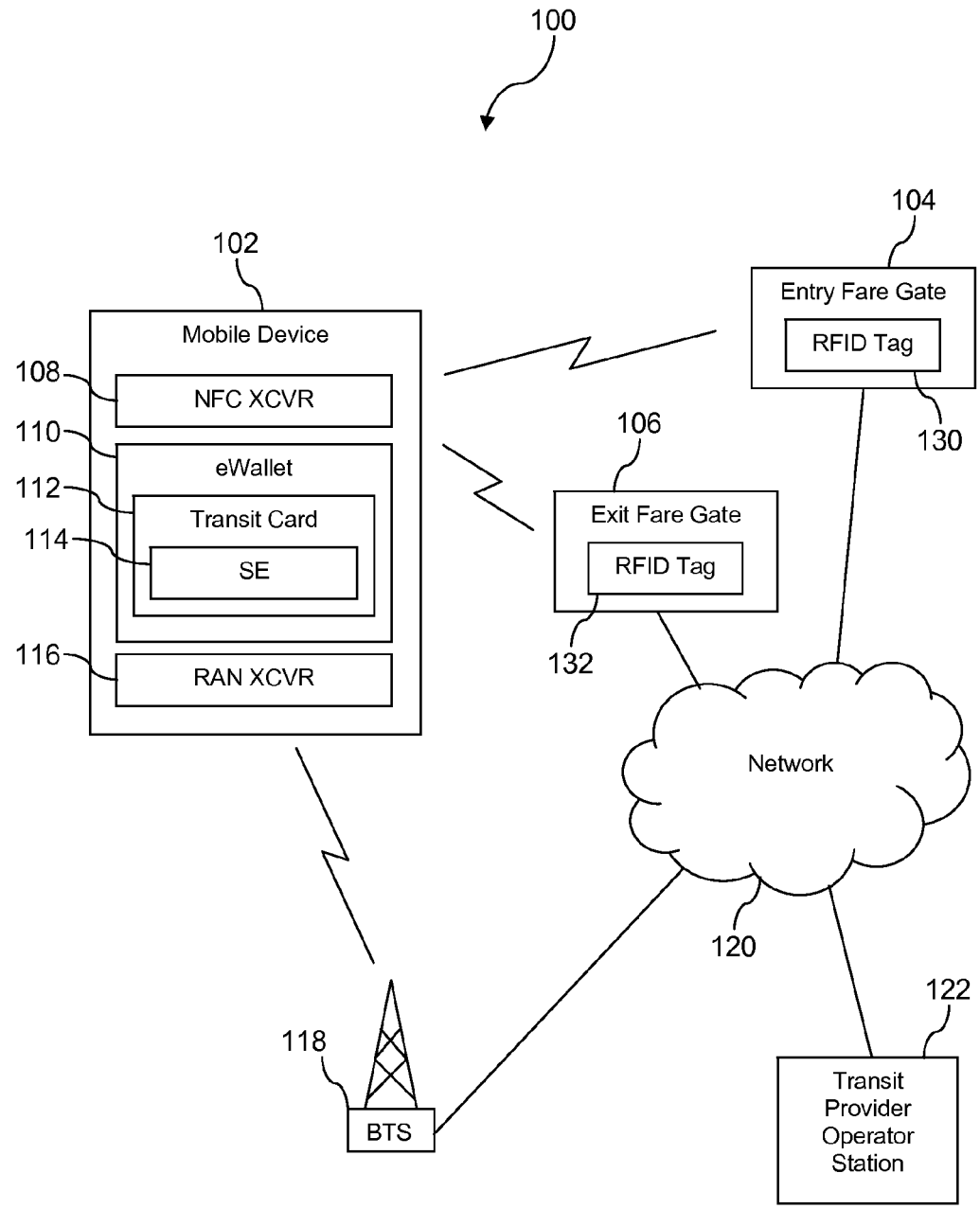
FIG. 1 illustrates an electronic payment system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In a transit card payment system, a transit card may enter a state prematurely or fail to transition state timely. As a result, the transit card may be in an out-of-sequence state that interferes with or prevents use of the transit card to access the transit system. For example, presenting a transit card or a mobile phone containing a transit card application to an entry fare gate may result in the state of the transit card transitioning to an exit coded state, wherein the next transaction is expected to be a message exchange with an exit fare gate, but the entry fare gate may not open the physical gate and allow the commuter to enter the transit system. This spurious state transition may occur if, for example, the transit card or the mobile phone containing the transit card application is not properly presented at the entry fare gate but is casually waved at the entry fare gate. Once in this exit coded state while outside the transit system, the transit card may not function properly. Presenting the transit card or mobile phone containing the transit card application to the entry fare gate while in the exit coded state may not result in gaining entrance to the transit system, because the entry fare gate expects to conduct an exchange with a entry coded transit card not an exit coded transit card. Similarly, presenting the transit card or mobile phone containing a transit card application to an exit fare gate may result in the state of the transit card transitioning to an entry coded state, where the next transaction is expected to be a message exchange with an entry fare gate, but the exit fare gate may not open the physical gate and allow the commuter to exit the transit system. Once in this entry coded state while still inside the transit system, the transit card may not function properly. Either of these conditions may be referred to as an out-of-sequence state of the transit card or mobile phone containing a transit card application.

The commuter can present their transit card or mobile phone containing a transit card in an out-of-sequence state to an employee of the transit system, for example at a transit system service booth, and have the employee resolve the problem. For example, the employee may over-ride the function of the fare gate and cause the gate to lift, allowing the commuter to either enter or exit the transit system, as needed, thereby overcoming the out-of-sequence condition. Alternatively, the employee may void the partial transaction as if it never happened. These current solutions to the out-of-sequence state problem, however, may be an inefficient use of the employee's time and may result in some transit system customer dissatisfaction based on having to wait in a line at the transit system service booth. Disclosed herein is an automated system and method for correcting out-of-sequence state problems of a transit card or a mobile phone containing a transit card application.

A self-help function is disclosed that promotes a mobile phone transit card application experiencing an out-of-sequence condition to change state to conform with the location of the commuter inside or outside of the transit system. In an embodiment, the mobile phone containing a transit card application may send an out-of-sequence self-help request message via a wireless communication link to the transit system service booth, and the transit system service booth may reply with an out-of-sequence correction message that causes the transit card application to transition to entry coded or exit coded, as appropriate. In another embodiment, the mobile phone containing a transit card application may contain functionality to promote self-correction of the out-of-sequence condition independent of intervention from the transit system service booth and to promote the user of the mobile phone to cause the transit card application to transition to entry coded or exit coded, as appropriate. In both of these embodiments, detecting and preventing prohibited state transitions, possibly to avoid paying transit fares or to avoid paying full price transit fares, is provided for. In some contexts, these prohibited state transitions may be referred to as prohibited transactions.

A variety of techniques to detect and/or prevent prohibited state transitions are contemplated by the present disclosure. A prohibited state transition may be an attempt to avoid paying the appropriate fee that is owed for using the transit system, an attempt to defraud the transit system operator, or it may be simply a mistake resulting from confusion or lack of understanding about how to use the transit card and/or the transit system technology correctly. In any case, it may be desirable to detect and take some action in response to the prohibited transaction. One technique may involve storing and/or recording how often a self-correction operation is conducted by a mobile phone and suspending the functionality of the transit card application on the mobile phone until an investigation of the abnormal number and/or rate of self-correction operations is completed and the abnormal number and/or rate of self-correction operations explained, for example by a user of the mobile phone transit card application. Another technique may involve storing a location of the mobile phone when a self-correction operation is conducted and making inferences based on the location and time of the self-correction operations. For example, if two self-correction operations are made in quick time succession at the same location proximate an exit fare gate, an inference may be made that the self-corrections were made to clear or confuse the determination of an elevated fare based on a lengthy commute. The inference drawn that an attempt has been made to reduce the fare that is due may be used by a fare gate to charge the maximal fare known to the transit system, in default of better information on the point of entry into the transit system. As mentioned above, the behavior observed by the system may not be motivated by a will to defraud but may be the result of an honest user error. In either case, the specific action may be deemed a prohibited transaction.

Another technique may involve storing the most recent message exchange with a fare gate and using this information in combination with information about self-correction operations to draw inferences. For example, if it is known that a normal transition from entry coded to exit coded occurred in coordination with a normal message exchange with an entry fare gate, that then a self-correction operation was performed to transition the state of the transit card application to an entry coded state, and finally, at a delayed point in time commensurate with using the transit system, at a separate location, a second self-correction operation was performed to transition the state of the transit card application to an exit coded state, and then the transit card application is used to pay a fare at an exit fare gate, an inference may be made that the self-correction functionality has been used to attempt to fraudulently disturb the proper calculation of the fare. As mentioned above, the behavior observed by the system may not be motivated by a will to defraud but may be the result of an honest user error. In either case, the specific action may be deemed a prohibited transaction.

In an embodiment, a radio frequency identity (RFID) tag may be located proximate to entry fare gates and to exit fare gates that may only be accessed from outside the transit system and inside the transit system, respectively. The out-of-sequence self-help operation may require the mobile device to read the appropriate radio frequency identity tag to complete the self-help operation. For example the mobile device may be required to read the radio frequency identity tag proximate to the entry fare gate to complete a state transition from exit coded to entry coded and to read the radio frequency identity tag proximate to the exit fare gate to complete a state transition from entry coded to exit coded.

Turning now to FIG. 1, a system 100 for electronic transit payment and for transit card state sequence self-help is discussed. The system 100 comprises a mobile device 102, an entry fare gate 104, and an exit fare gate 106. The mobile device 102 may comprise a near field communication (NFC) transceiver 108, an electronic wallet 110, and a radio access network (RAN) transceiver 116. The electronic wallet 110 may comprise a transit card application 112. The transit card application 112 may comprise a secure element (SE) 114. The mobile device 102 may communicate with a network 120 via a wireless link to a base transceiver station 118. A transit provider operator station 122, for example a computer station at a transit system service booth housing an operator employed by the transit system, may communicate with the entry fare gate 104 and the exit fare gate 106 via wired or wireless links to the network 120. In some embodiments, the transit provider operator station 122 may be located proximate to one of the entry fare gate 104 and the exit fare gate 106. In some embodiments, some fare gates may be dual function and operate in the capacity of the entry fare gate 104 to enter the transit system and operate in the capacity of the exit fare gate 106 to exit the transit system. In some embodiments, the transit provider operator station 122, the entry fare gate 104, and the exit fare gate 106 may be implemented as general purpose computer systems. General purpose computer systems are described in greater detail hereinafter. The transit provider operator station 122 may communicate via wired or wireless link to the network 120 and thence through the base transceiver station 118 via wireless link to the mobile device 102.

The mobile device 102 may be any of a variety of portable electronic devices including a mobile phone, a personal digital assistant (PDA), a laptop computer, a tablet computer, a media player, and other similar devices. In some embodiments, the mobile device 102 may be similar to a handset. Handsets are described in greater detail hereinafter. In some embodiments, the mobile device 102 may be similar to a general purpose computer. General purpose computers are discussed in greater detail hereinafter.

The transit card application 112 may promote storing a funds balance, for example in the secure element 114, and exchanging messages with the entry fare gate 104 and the exit fare gate 106 to access and pay for use of a transit system. For example, when the mobile device 102 is presented to the entry fare gate 104, an action that may be referred to as tapping the entry fare gate 104 with the mobile device 102, the near field communication transceiver 108 may exchange messages with the entry fare gate 104. In a normal successful interaction, the entry fare gate 104 may validate the transit card application 112, cause the transit card application 112 to transition to an exit coded state, store information related to the location and time of admission to the transit system into the transit card application 112, and open a gate to allow the user of the mobile device 102 to physically enter the transit system. After having gained access, for example by entering a bus stop area or a subway train platform, the user of the mobile device 102 may be transported from a first location to a second location by a vehicle operated by the transit system.

At the second location, the user of the mobile device 102 may exit the vehicle operated by the transit system, approach an exit fare gate 106, present the mobile device 102 at the exit fare gate 106 to pay the fare and to exit the transit system. For example, the near field communication transceiver 108 may exchange messages with the exit fare gate 106. In a normal successful interaction, the exit fare gate 106 may validate the transit card application 112, cause the transit card application 112 to transition to an entry coded state, store information related to the location and time of exiting the transit system into the transit card application 112, determine a fare, cause the transit card application 112 to deduct the determined fare from a funds balance stored by the transit card application 112, and open a gate to allow the user of the mobile device 102 to physically exit the transit system.

In various circumstances, the transit card application 112 exchange with either the entry fare gate 104 and the exit fare gate 106 may cause the transit card application 112 to change state, for example from entry coded to exit coded or from exit coded to entry coded, without opening the associated gate that allows the user of the mobile device 102 to either physically enter or leave the transit system in conformance with the change of state. This condition may be referred to as an out-of-sequence state of the transit card application 112. The transit card application 112 may provide an interface or a dialog box that prompts a user of the mobile device 102 to select a self-help function to correct the out-of-sequence state of the transit card application 112.

In one embodiment, the transit card application 112 may relay the selection of the out-of-sequence self-help function to the transit provider operator station 122, for example a transit card service station proximate to the entry fare gate 104 and/or the exit fare gate 106. The transit provider operator station 122 may respond by sending a state change command to the transit card application 112 causing a state transition from an exit coded to an entry coded state or from an entry coded state to an exit coded state, as appropriate. The communication between the transit card application 112 and the transit provider operator station 122 may be supported by a wireless link between the mobile device 102 and the base transceiver station 118 and by wired links from the base transceiver station 118 through the network 120 to the transit provider operator station 122. The wireless link between the mobile device 102 and the base transceiver station 118 may be provided by code division multiple access (CDMA), global system for mobile communication (GSM), worldwide interoperability for microwave access (WiMAX), and other radio communication technologies. In an embodiment, the communication between the transit card application 112 and the transit provider operator station 122 may be supported by a WiFi radio link, Bluetooth radio link, or other wireless link between the mobile device 102 and the transit provider operator station 122. In another embodiment, the transit card application 112 may be operable to respond to selection of the out-of-sequence self-help function by changing state from exit coded to entry coded or from entry coded to exit coded, as appropriate. Once the out-of-sequence state has been corrected, the user may present the mobile phone 102 to the entry fare gate 104 and enter the transit system or to the exit fare gate 106 and exit the transit system, as appropriate.

In an embodiment, one or more techniques may be employed to prevent prohibited transactions based on out-of-sequence self-help correction. While discussed separately, it will be readily appreciated that, in some embodiments, two or more of these techniques may be concurrently deployed. According to one technique, the number of times that the out-of-sequence self-help function has been selected—either a total number of times since initiation of the transit card application 112 and/or a number of times per suitable period of time—is automatically monitored with respect to a predefined threshold. The transit card application 112 and/or the transit system may store a record of out-of-sequence self-help operations. In an embodiment, the transit card application 112 may store the record in the secure element 114. If the number of times the out-of-sequence self-help function is selected exceeds the pre-defined threshold, the function of the transit card application 112 may be disabled indefinitely, pending an investigation by the transit system provider and determination of whether fare fraud or simply an instance of user operator error has occurred. If appropriate, the transit system provider may re-enable the function of the transit card application 112 for use in the transit system. The monitoring function may be provided within the transit system provider's network (not shown) or may be provided by the transit card application 112.

According to another technique, information stored when the transit card application 112 interacts with a fare gate and/or when the out-of-sequence self-help function is selected is used to draw inferences about attempts to defraud the normal assessment and payment of fares using the transit card application 112. In an embodiment, the transit card application 112 stores a record of at least the last completed transaction with a fare gate, for example the entry fare gate 104 and/or the exit fare gate 106. The fare gate transaction record may comprise at least one of a time of transaction, an identity of the fare gate, a state transition of the transit card application 112, a location of the fare gate, and other information. The transit card application 112 may store the record in the secure element 114. In an embodiment, the transit card application 112 stores a record of out-of-sequence self-help operations, for example in the secure element 114. The transit card application 112 may draw an inference that fraud based on use of the out-of-sequence self-help operation may have occurred and may take appropriate action, for example, notifying the transit system and/or charging an appropriate maximum possible fare. As mentioned above, it is understood that the prohibited transaction, in some circumstances, may be due not to fraud but to simple user error.

The inference of fraud may be drawn under a number of different circumstances. In a first circumstance, if a transaction is completed with the entry fare gate 104 and then two out-of-sequence self-help operations are conducted before completing a transaction with an exit fare gate 106, fraud may be inferred. In a second circumstance, if a transaction is completed with the entry fare gate 104 at a first time and at a first location and at a distinctly later time, for example at least two minutes later, an out-of-sequence self-help operation takes place immediately before completing a transaction with the exit fare gate 106, fraud may be inferred. Other particular combinations and sequences of out-of-sequence self-help operations and completed fare gate transactions may also be analyzed to infer fraud attempts. As noted several times above, notwithstanding the inference of fraud, the prohibited transactions may have been due to simple user error.

In another embodiment, a first radio frequency identity (RFID) tag 130 may be located on the entry fare gate 104 such that it can be scanned by the mobile device 102 held by a user located outside the transit system but cannot be scanned by the mobile device 102 held by the user located inside the transit system. To complete the out-of-sequence self-help operation to change the state of the transit card application 112 from the exit coded state to the entry coded state, the mobile device 102 may be required to scan the first RFID tag 130 while in the exit coded state. Similarly, a second RFID tag 132 may be located on the exit fare gate 106 such that it can be scanned by the mobile device 102 held by a user located inside the transit system but cannot be scanned by the mobile device 102 held by the user located outside the transit system. To complete the out-of-sequence self-help operation to change the state of the transit card application 112 from the entry coded state to the exit coded state, the mobile device 102 may be required to scan the second RFID tag 132 while in the entry coded state.

Figure 2:
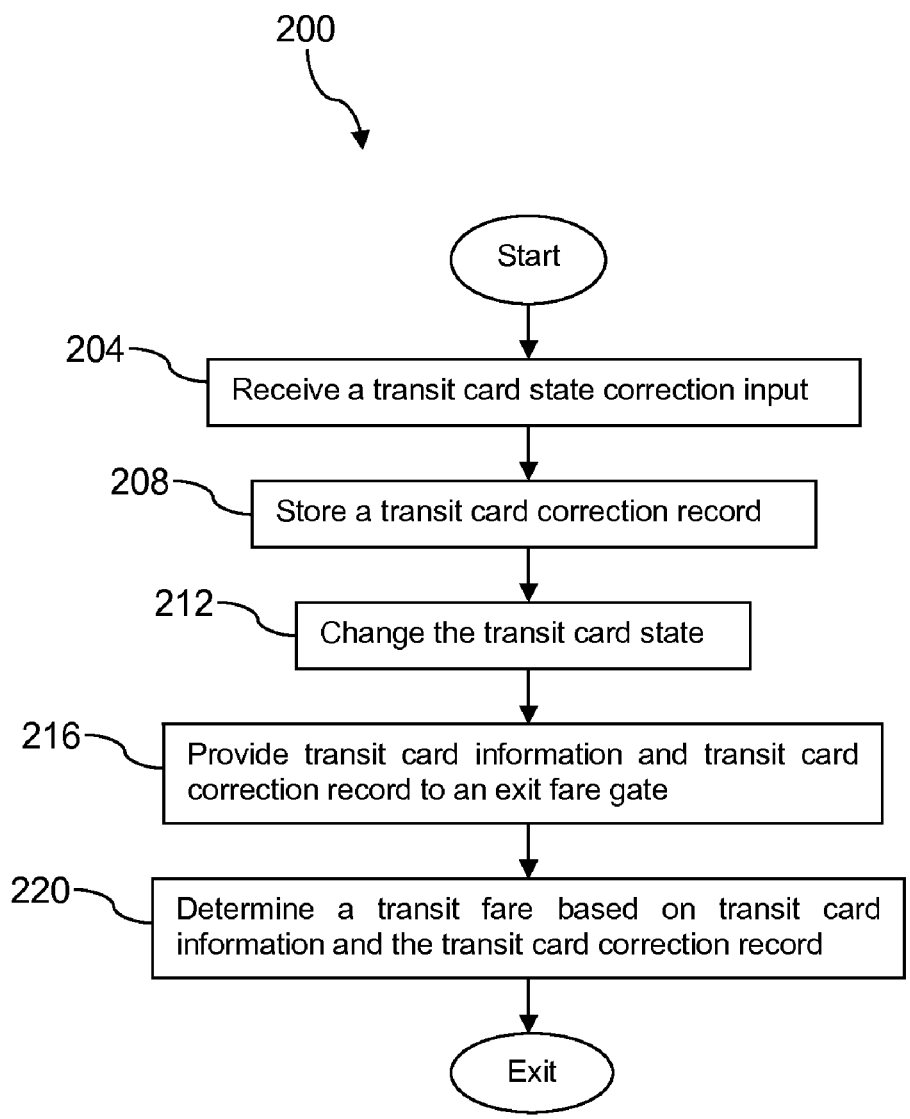
FIG. 2 is a flow chart of a method according to an embodiment of the disclosure.

Turning now to FIG. 2, a method 200 is described. At block 204, a transit card application state out-of-sequence self-help correction input is received. For example, a user of the mobile device 102 may use an interface of the mobile device 102, for example a key pad, a key board, and/or a touch surface, to select out-of-sequence self-help. The interface may include a graphical user interface (GUI), for example a frame or a dialog box, that prompts the user to select the out-of-sequence self-help correction operation.

In block 208, a record of the transit card application state out-of-sequence self-help correction operation input is stored, for example in the secure element 114 of the mobile device 102. In block 212, the transit card application 112 changes state in response to the out-of-sequence self-help correction input, for example by changing state from an exit coded state to an entry coded state or from an entry coded state to an exit coded state. This change of state may restore the transit card application 112 to an in-sequence state condition and promote normal use of the transit card application 112 to enter the transit system and to pay a fare and exit the transit system.

In block 216, transit card information and the record of the transit card application out-of-sequence self-help correction operation is transmitted or otherwise provided, for example to the exit fare gate 106. In block 220, the appropriate transit fare is determined and the appropriate funds deducted from a funds balance of the transit card application 112, for example a funds balance stored in the secure element 114. In an embodiment, the transit card application 112 may calculate or otherwise determine the appropriate fare based on information about the entry fare gate 104 the mobile device 102 passed to enter the transit system, based on information about the exit fare gate 106 the mobile device is preparing to pass to exit the transit system, and based on any information about out-of-sequence self-help operations that have been completed. It is understood that the transit card application 112 may take a variety of actions if fraudulent or otherwise unsanctioned out-of-sequence self-help operations have been performed. These actions may include determining a maximum fare, transmitting a message to the transit system, for example via the exit fare gate 106, reporting unsanctioned out-of-sequence self-help operations, and/or disabling the transit card application 112 pending an investigation by the transit system provider. Alternatively, the exit fare gate 106 may determine the appropriate fare and cause the transit card application 112 to deduct the corresponding fees from a funds balance. The exit fare gate 106 may make inferences based on partial transactions or out-of-sequence transactions similar to those described above with reference to the transit card application 112. The exit fare gate 106 may take similar actions in the event that it determines that unsanctioned out-of-sequence state self-help operations have been performed by the transit card application 112. The process then exits.

Figure 3:
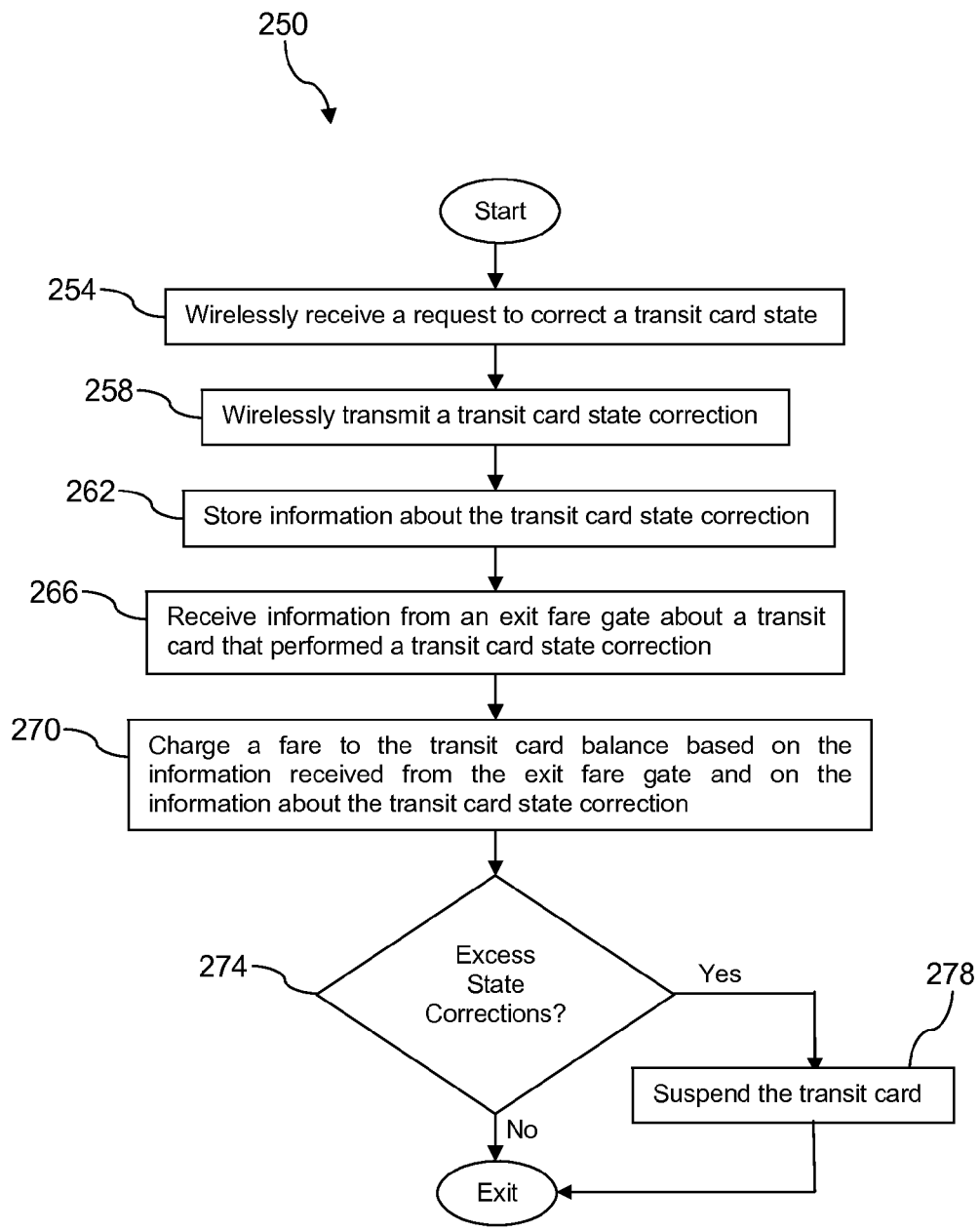
FIG. 3 is a flow chart of another method according to an embodiment of the disclosure.

Turning now to FIG. 3, a method 250 is described. In block 254, an out-of-sequence self-help request to correct a transit card application state is received wirelessly. The out-of-sequence self-help request may be received over any of a variety of public land mobile networks, for example using code division multiple access (CDMA), global system for mobile communication (GSM), worldwide interoperability for microwave access (WiMAX), and/or other wireless technologies. The request may be received by the base transceiver station 118 and then transmitted via wired links to the transit system provider, for example to the transit provider operator station 122 and/or to a central office location of the transit system provider. In some contexts, the out-of-sequence self-help operation may also be referred to as the transit card state correction or the state correction.

In block 258, a correction message is wirelessly transmitted. The correction message may contain an instruction that may be executed, for example by the transit card application 112 and/or the secure element 114 on the mobile device 102. In block 262, information about the correction operation is stored and/or saved, for example in a central database or other memory storage associated with the transit system provider.

In block 266, information is received from an exit fare gate, for example the exit fare gate 106, about a transit card application that has performed an out-of-sequence self-help transit card application state correction. In block 270, the information received from the exit fare gate 106 is used in combination with the information about the out-of-sequence self-help operation stored in block 262 to determine an appropriate fare. If the out-of-sequence self-help operation is deemed normal, a normal fare calculation is performed. Alternatively, if the out-of-sequence self-help operation is deemed unsanctioned, the fare calculation may determine the highest fare available in the system.

In block 274, if an excess number of state corrections have been performed by the subject transit card application, for example the transit card application 112, the process proceeds to block 278 where the transit card application 112 may be suspended pending an investigation into the unusual number of state corrections performed by the transit card application 112. Otherwise the processing exits.

Figure 4:
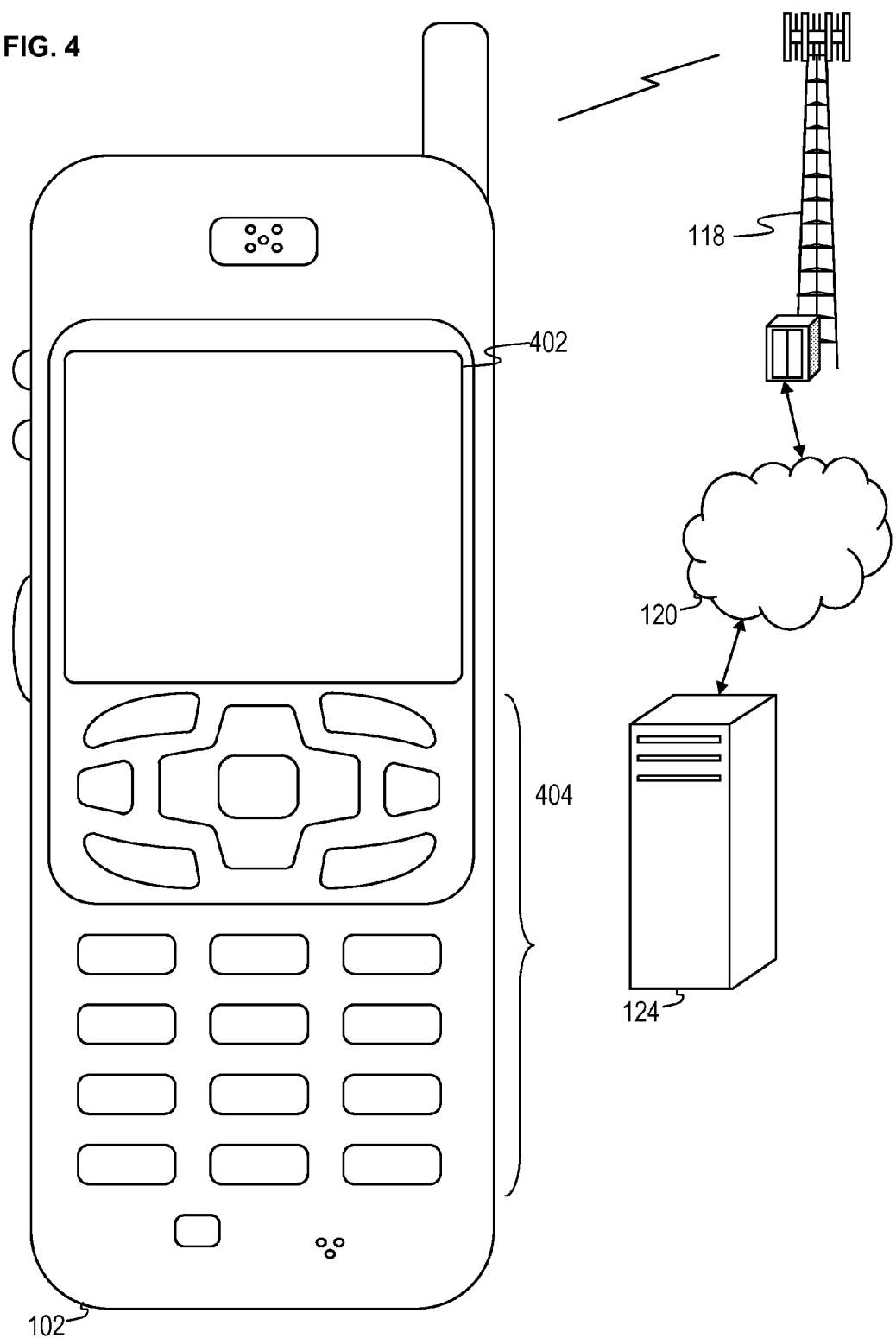
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a portable computer, a tablet computer, or a laptop computer. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer handset 102.

The mobile device 102 may execute a web browser application which enables the display 402 to show a web page. The web page may be obtained via wireless communications with the base transceiver station 118, a wireless network access node, a peer handset 102 or any other wireless communication network or system. The base transceiver station 118 (or wireless network access node) is coupled to the network 120. Via the wireless link and the wired network, the mobile device 102 has access to information on various servers, such as the provisioning server 124. The provisioning server 124 may provide content that may be shown on the display 402. Alternately, the mobile device 102 may access the base transceiver station 118 through a peer handset 102 acting as an intermediary, in a relay type or hop type of connection.

Figure 5:
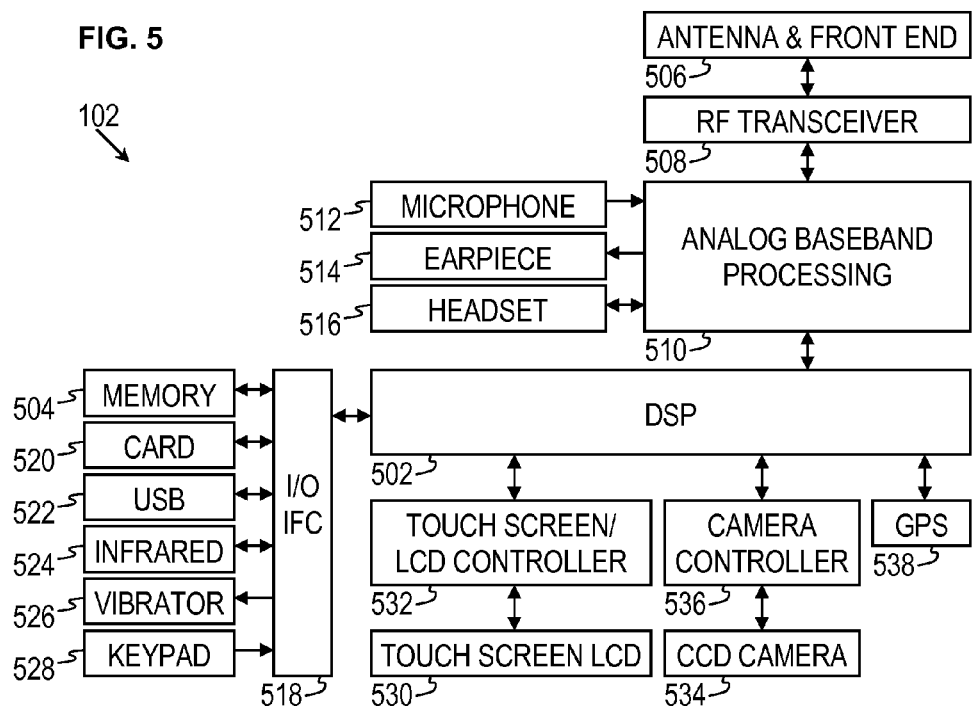
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a cellular network or some other available wireless communications network or from a peer handset 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver 508 may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
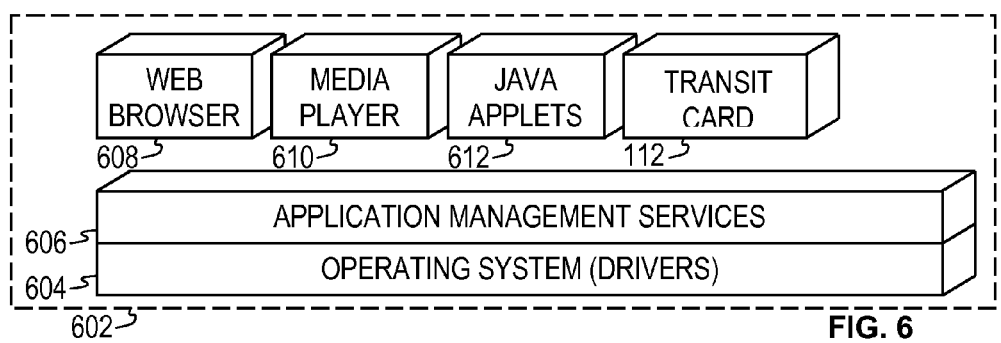
FIG. 6 is an illustration of a software architecture of a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, a plurality of JAVA applets 612, and the transit card application 112. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
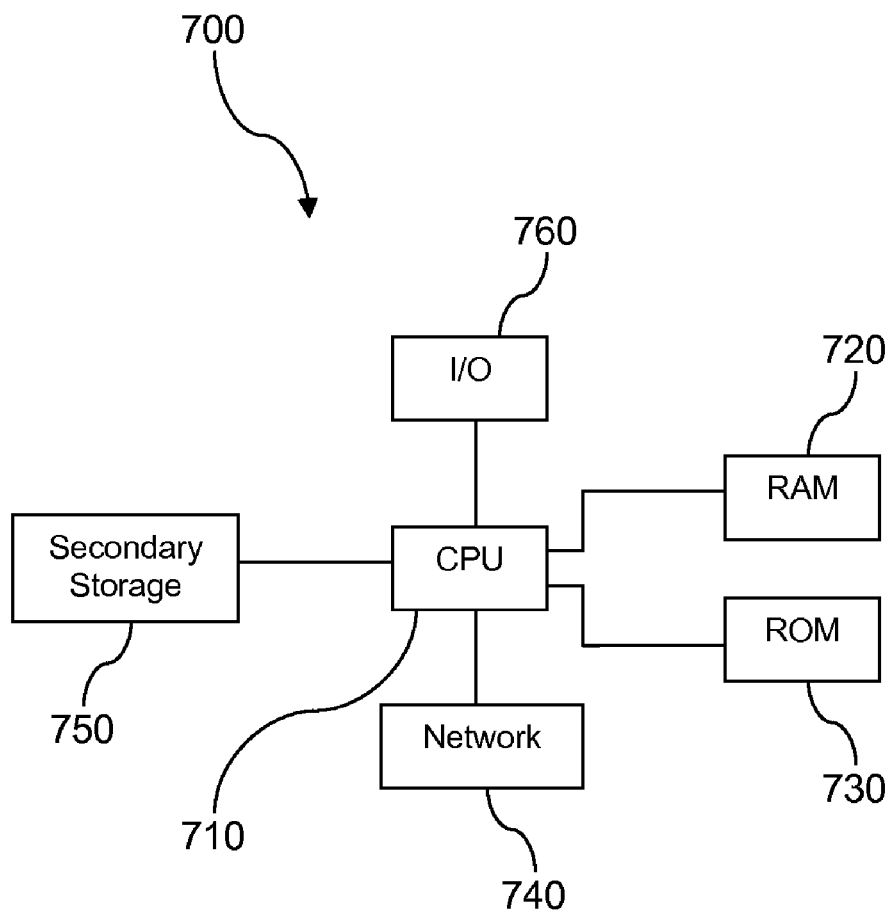
FIG. 7 illustrates an exemplary general purpose computer system suitable for implementing some aspects of the several embodiments of the disclosure.

Aspects of the system 100 described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 700 includes a processor 710 (which may be referred to as a central processor unit or CPU) that is in communication with memory devices including secondary storage 750, read only memory (ROM) 730, random access memory (RAM) 720, input/output (I/O) devices 760, and network connectivity devices 740. The processor 710 may is typically comprised of one or more disk drives or tape drives and is used for non-volatile storage of data and as an over-flow data storage device if RAM 720 is not large enough to hold all working data. Secondary storage 750 may be used to store programs which are loaded into RAM 720 when such programs are selected for execution. The ROM 730 is used to store instructions and perhaps data which are read during program execution. ROM 730 is a non-volatile memory device which typically has a small memory capacity relative to the larger memory capacity of secondary storage 750. The RAM 720 is used to store volatile data and perhaps to store instructions. Access to both ROM 730 and RAM 720 is typically faster than to secondary storage 750.

I/O devices 760 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 740 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 740 may enable the processor 710 to communicate with an Internet or one or more intranets. With such a network connection, it is contemplated that the processor 710 might receive information from the network, or might output information to the network in the course of performing the above-described method steps. Such information, which is often represented as a sequence of instructions to be executed using processor 710, may be received from and outputted to the network, for example, in the form of a computer data signal embodied in a carrier wave.

Such information, which may include data or instructions to be executed using processor 710 for example, may be received from and outputted to the network, for example, in the form of a computer data baseband signal or signal embodied in a carrier wave. The baseband signal or signal embodied in the carrier wave generated by the network connectivity devices 740 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 710 executes instructions, codes, computer programs, scripts which it accesses from hard disk, floppy disk, optical disk (these various disk based systems may all be considered secondary storage 750), ROM 730, RAM 720, or the network connectivity devices 740. While only one processor 710 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of electronic transit fare payment, comprising:
    receiving, by a mobile device, a transit card state correction input for a transit card responsive to the transit card being in a transit card state that is unexpected, wherein the transit card state is one of an entry coded state and an exit coded state, and wherein the unexpected state is the exit coded state when the transit card is outside of a transit system and the entry coded state when the transit card is inside of the transit system;
    storing, by the mobile device, a transit card state correction record based on receiving the transit card state correction input;
    changing, by the mobile device, the transit card state to an expected state in response to receiving the transit card state correction input, wherein the expected state is the entry coded state when the transit card is outside of the transit system and the exit coded state when the transit card is inside of the transit system;
    providing, by the mobile device, transit card information including the transit card state correction record to an exit fare gate to support electronic payment with a transit card; and
    deducting, by the mobile device, a maximum fare from a funds balance based on information from an exit fare gate about the transit card and on the transit card state correction record when the time difference between receiving information from the exit fare gate and receiving a request to correct the transmit card state is less than a pre-defined threshold based upon a determination that an attempt to charge an erroneous fare has occurred,
    wherein the mobile device comprises a mobile phone, a personal digital assistant, a laptop computer, a tablet computer, a media player, or a handset.

2. The method of claim 1, wherein when the transit card is in the exit coded state and is outside of the transit system, changing the transit card state in response to receiving the transit card state correction input causes the transit card state to change to the entry coded state and when the transit card is in the entry coded state and is inside of the transit system, changing the transit card state in response to receiving the transit card state correction input causes the transit card state to change to the exit coded state.

3. The method of claim 1, wherein the transit card state correction record includes at least one of a timestamp of the transit card state correction input, the transit card state before changing the transit card state in response to receiving the transit card state correction input, a location of the transit card, an identity of a fare gate that last communicated with the transit card before receiving the transit card state correction input, and a timestamp of the communication with the fare gate that last communicated with the transit card before receiving the transit card state correction input.

4. The method of claim 3, wherein when two transit card state correction inputs are received since the transit card last communicated with a fare gate, the amount of the electronic transit fare payment is determined as the fare from the fare gate that last communicated with the transit card to the exit fare gate.

5. The method of claim 1, further including when changing the transit card state is determined to be a prohibited transaction, wirelessly transmitting information about the prohibited transaction to the transit card payment system.

6. A method of charging a fare electronically, comprising:
    wirelessly receiving, by a transit system computer from a mobile device, a request to correct a transit card state of a transit card from an unexpected state to an expected state, wherein the transit card state is one of an entry coded state and an exit coded state, wherein when the transit card is outside of a transit system the unexpected state is the exit coded state and the expected state is the entry coded state, and wherein when the transit card is inside of the transit system the unexpected state is the entry coded state and the expected state is the exit coded state;
    wirelessly transmitting, by a transit system computer, a transit card state correction to the mobile device in response to the request to correct the transit card state;
    storing, by a transit system computer, information about the transit card state correction, wherein the information about the transit card state correction includes at least one of a timestamp of the transit card state correction, an identity of a subscriber associated with the transit card, a location of the transit card, an identity of the last fare gate that the transit card successfully communicated with, or a time that the transit card communicated with the last fare gate;

charging, by a fare gate, a fare to the transit card based on the information about the transit card state correction;

determining, by a transit system computer, a rate of transit card state corrections associated with the transit card; and suspending, by a transit system computer, the transit card when the rate of transit card state corrections is above a pre-defined threshold.

7. The method of claim 6, wherein the charging the fare to the transit card is also based on information received from an exit fare gate, and wherein when the time difference between the receiving information from the exit fare gate and the receiving the request to correct the transit card state is less than a pre-defined threshold, further including:

determining that an attempt to charge an erroneous fare has occurred; and charging the maximum fare to the transit card.

8. The method of claim 7, further including wirelessly transmitting a message to the mobile device associated with the transit card with notification of the determining the attempt to charge an erroneous fare.

9. The method of claim 6, wherein the mobile device comprises a mobile phone, a personal digital assistant, a laptop computer, a tablet computer, a media player, or a handset.

10. The method of claim 6, wherein receiving two requests to correct a transit card state since the last communication of the transit card with an exit fare gate is a prohibited transaction.

11. The method of claim 10, wherein when the prohibited transaction is identified, the maximum fare is charged to the transit card.

12. A mobile device, comprising:

a processor;

a near field communication transceiver adapted for communicating with an entry fare gate to enter the transit system and with an exit fare gate to pay for use of the transit system; and a transit card application having a funds balance that, when executed on the processor, is adapted to change a transit card state from an unexpected state to an expected state in response to an input received by the mobile device, wherein the transit card state is one of an entry coded state and an exit coded state, wherein when the transit card is outside of a transit system the unexpected state is the exit coded state and the expected state is the entry coded state, and wherein when the transit card is inside of the transit system the unexpected state is the entry coded state and the expected state is the exit coded state, to store a record of the change to the expected state, and to deduct a maximum fare from the funds balance based on information from the exit fare gate about the transit card and on the record of the change to the expected state when the time difference between receiving information from the exit fare gate and receiving a request to correct the transmit card state is less than a pre-defined threshold based upon a determination that an attempt to charge an erroneous fare has occurred.

13. The mobile device of claim 12, wherein the transit card application is adapted to change the transit card state from the unexpected state to the expected state in response in part to receiving a corroborating proof of the mobile device being one of inside the transit system and outside the transit system.

14. The mobile device of claim 13, wherein the corroborating proof of the mobile device being outside of the transit system is provided by the near field communication transceiver receiving a signal from an entry fare gate and the corroborating proof of the mobile device being inside the transit system is provided by the near field communication transceiver receiving a signal from an exit fare gate.

15. The mobile device of claim 13, wherein the corroborating proof is provided based in part on a location of the mobile device.

16. The mobile device of claim 12, wherein the record of the change to the expected state includes at least one of a timestamp, a location, and an identity of a last fare gate that communicated with the mobile device.

17. The mobile device of claim 12, wherein the transit card application is adapted to change the transit card state from the unexpected state to the expected state in response in part to receiving a secret key that is provided as input to the mobile device.

* * * * *